Jan. 18, 1944.  H. W. DUDLEY  2,339,465
SYSTEM FOR THE ARTIFICIAL PRODUCTION OF VOCAL OR OTHER SOUNDS
Filed July 10, 1942  6 Sheets-Sheet 3

INVENTOR
*H. W. DUDLEY*
BY
*H. A. Burgers*
ATTORNEY

Jan. 18, 1944.  H. W. DUDLEY  2,339,465
SYSTEM FOR THE ARTIFICIAL PRODUCTION OF VOCAL OR OTHER SOUNDS
Filed July 10, 1942  6 Sheets-Sheet 5

INVENTOR
*H. W. DUDLEY*
BY
*H. A. Burgess*
ATTORNEY

FIG. 13

Patented Jan. 18, 1944

2,339,465

UNITED STATES PATENT OFFICE 2,339,465

SYSTEM FOR THE ARTIFICIAL PRODUCTION OF VOCAL OR OTHER SOUNDS

Homer W. Dudley, Summit, N. J., assignor to Bell Telephone Laboratories, Incorporated, New York, N. Y., a corporation of New York Application July 10, 1942, Serial No. 450,420

31 Claims. (Cl. 179—1)

The present invention relates to wave transmission or control, involving waves of frequency band characteristics, for intelligence transmission, sound production or reproduction or other purposes. More specifically, objects of the invention are analysis, synthesis, production, reproduction, reconstruction, simulation, imitation, modification and control of sounds and waves representing sounds, especially music, speech sounds and vocal and non-human effects of usual and unusual character.

Specific aspects of the invention are controlling the character of synthesized or reconstructed speech by artificially modifying certain characteristics of the speech.

The invention relates to the general type of wave control or wave production that is disclosed in my United States Patents 2,151,091, of March 21, 1939, and 2,243,089, of May 27, 1941, and patent to Reisz 2,183,248, of December 19, 1939, and for its general object it contemplates certain improvements or modifications of the system and methods therein disclosed.

In accordance with the disclosure of my prior patents referred to, a wave having the characteristics of speech or music, for example, may be produced artificially using as the original material wave energy of the characteristics of speech or music having a frequency distribution which is different from that to be desired, the original waves being so modified as to produce the desired wave with a different energy distribution from that of the original and with new and different results.

In another form of the invention of said prior patents, which in part is carried over in this disclosure, the wave energy serving as raw material comprises two types of waves simulating, respectively, a buzzer-like tone and a hissed or unvoiced wave. A speech or music wave may be analyzed for fundamental characteristics of pitch and energy distribution and by means of a synthesizer system the product of the analysis is used to construct the final wave out of the original raw material.

While the system of the first prior patent referred to is susceptible of many types of uses and embodiments, one of its aims is to secure faithful transmission and reproduction of speech, music or other waves. The second of the prior inventions was directed more specifically to securing a deliberate change of character between the analyzed waves and the constructed waves. This change in character may be desirable for many purposes, such as rendering speech more understandable or for purposes of imitation, impersonation, entertainment and for kindred purposes.

The present invention represents an extension and further development of the prior patents disclosures to obtain other and new results. To this end the circuit arranements, to be explained more fully hereinafter, use many of the elements shown in the prior patents in an analogous manner and by combining therewith other elements which produce these novel effects.

The nature and objects of the invention will be more fully apparent from the detailed description to follow read in connection with the accompanying drawings in which.

Figure 1:
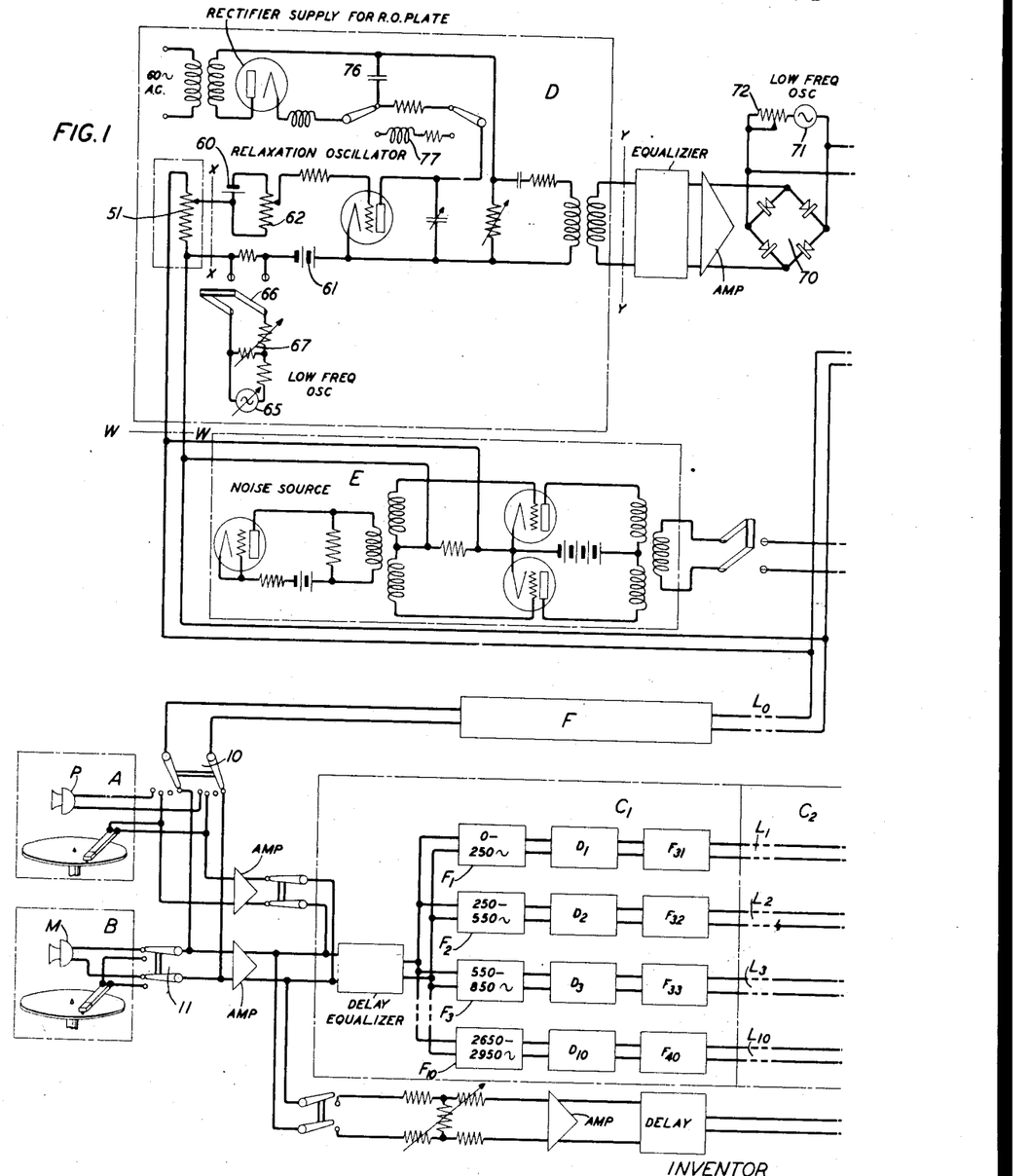
Figs. 1 and 2 are to be taken together as representing a fairly composite circuit for obtaining many of the new results.
Figure 2:
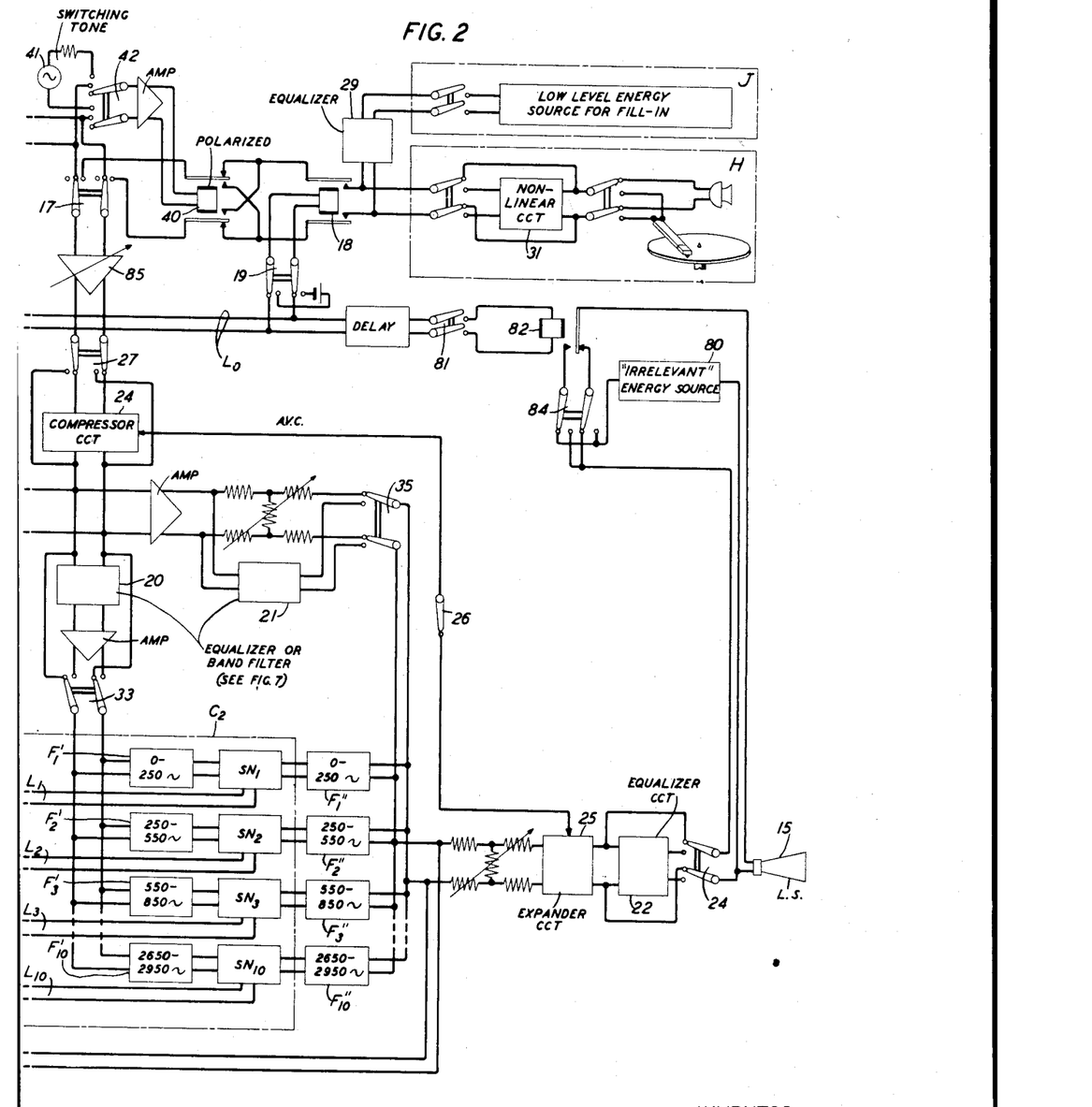

In order to obtain the variety of desired effects, the circuit of Figs. 1 and 2 may be altered at will by the operation of certain switches which render certain structures effective or ineffective. In the complete circuit those structures which are shown explicity in the circuit would all be closely assembled. In addition to those now shown on Figs. 1 and 2, however, the complete unit would include also suitable arrangements by which the structures of Figs. 7 to 13 could similarly be brought into operation or rendered ineffective by the suitable switching mechanism referred to above. However, in order to avoid undue confusion in the disclosure of my invention, the structures of Figs. 7 to 13 are not included directly with the circuit of Figs. 1 and 2 although it is to be understood that they are present for insertion in the complete circuit in a manner analogous to that for the various structures now shown in connection with said Figs. 1 and 2.

Referring more particularly to Fig. 1, there is shown at A a source of speech or music, such as from a microphone or a record, which may be rendered effective on the circuit or not, as desired, by the switch 10. A second source of speech or music or other sound is shown at B subject to a switch 11 by which any one of two or more individual sources may be rendered effective on the circuit. Sound waves from either or both of these sources are impressed on an analyzer-synthesizer circuit shown at $C_1$, $C_2$— partly in Fig. 2—this circuit being the same in nature as a similar circuit in my Patent 2,243,089. Specifically, the analyzer portion $C_1$ of this circuit analyzes the incoming sound wave into a definite number of frequency bands, rectifies each band and gives rise to a group of low frequency wave patterns in the manner more fully described in my said patent.

In addition, Fig. 1 shows a source of buzz noise at D and a source of hiss noise at E, each of these performing substantially the same function as the corresponding buzz and hiss sources in my said patent. Here the source D is shown as powered from a rectifier unit. These two sources of noise are controlled by the pitch characteristics of the sound waves emanating from A or from B, operating through a frequency pattern control circuit F. This frequency pattern control circuit is similar to that shown in my patent and discriminates as to the fundamental frequency when there is one. Certain further details of Fig. 1 will be described later.

In the Fig. 2 portion of the circuit there is shown the synthesizing structure $C_2$ comprising a plurality of parallel circuits each capable of transmitting a frequency band which in general would correspond with the frequency bands of the analyzer of $C_1$ of Fig. 1. The input energy of $C_2$ may come from the sources D and E and the amount of current transmitted by each branch is controlled by the low frequency wave patterns arriving from the analyzer $C_1$. These outputs are then combined and proceed to a receiving device such as the loud-speaker 15.

In addition, there is shown in connection with Fig. 2 a third source H comprising two or more separate and independent sources of sound waves. These sound waves, rendered effective by switch 17 and relay 18, may be fed directly to the input of the synthesizing structure $C_2$ subject to such control as may be exercised by the analyzer $C_1$. As thus described, the circuit of Fig. 2 is essentially disclosed in my Patent 2,243,089. Other additional features, however, will be described in further detail later.

For a fuller understanding of my invention it should be mentioned that as one listens to a sound stream of any sort he finds it characterized by three physical qualities—intensity, pitch and spectrum. The proper intensity is needed for good perception by the ear. This aspect of a sound stream can, however, readily be controlled by amplifiers and loss controls so that this characteristic of intensity need not be considered further. The other two physical characteristics of the sound stream, namely, pitch and spectrum, are, however, extremely important in the interpretation of the sound stream, particularly if it partakes of the nature of speech or music.

The term "pitch" is used herein with a more general significance than is the usual case. Roughly, it indicates the frequency pattern. For a simple periodic sound it indicates the fundamental frequency, the other component frequencies being multiples thereof. For a sound that is entirely non-periodic in nature, it is considered that all frequency components are present so that the fundamental frequency or pitch is zero. Such sounds are the unvoiced sounds of normal speech, the whispered sounds and a wide variety of sounds found in nature and produced by the various mechanical devices developed by man for his use. Natural non-periodic sounds include rustling of leaves, crunching of food, the roar of a waterfall or of surf, blowing of the wind, etc. Man-made non-periodic sounds include the hissing of steam, flow of water from spigots, scraping of a floor, etc. There are many sounds in the voice and elsewhere that partake of a mixed nature as regards periodicity. As to pitch, such sounds may be considered as a summation of components in harmonic relation having a true fundamental, plus a summation of other components that bear inharmonic relations to each other.

The spectrum gives the distribution of power versus frequency from instant to instant. Ideally, the spectrum should give every point precisely. Practically, it is convenient to approximate this with frequency bands of finite width. In this application the invention will be described chiefly in terms of a 0–250 cycle band and thereafter nine 300-cycle bands giving a total range corresponding to commercial telephone circuits. It is to be understood, however, that such subdivision of the spectrum power is illustrative only and other divisions may be used. The circuits of my Patent 2,243,089 make use of this concept of power distribution in a limited number of bands of finite width, these being used to control certain sources of sound. From such a circuit, which is sometimes called the "Vocoder," it becomes apparent as to the nature of speech that the intelligibility is contained entirely or almost entirely in the spectrum, while the emotional content is contained in the pitch almost entirely. The intelligibility is retained equally well where the remade speech is made with the same pitch as the original speech possessed or where it is made from a buzzer-like monotone or from a zero-pitch random noise. In the latter case a whisper is formed. While it has good intelligibility, no amount of varying the pitch alone will make the remade speech intelligible if the spectrum is not properly fashioned but the pitch with is ineffection or variation from moment to moment does give life and expression to the voice. The content of a song is largely emotional and can therefore well be expressed by a pitch variation such as can be written on the musical scale. In questions, comments and interjections, each receives a maximum emotional content which is displayed by correspondingly large pitch variations. Similarly, excitement, joy, anger and other emotions are expressed by the suitable pitch control. In whispering without pitch voices become much alike and lose their emotional expression in a marked degree.

From the foregoing explanation of the nature of speech as shown by analysis, it becomes apparent that if the sound output is to have intelligibility it must obtain this through a proper control of the spectrum as it cannot be obtained in any other way. Suppose one wishes to give voice effects to some special sound such as a generator hum. If the hum can be used to control the pitch only and still retain the desired characteristic, then there will be intelligible speech from the hum and the effect will be of an electric generator talking or singing. If, however, this cannot be readily arranged, then some special method of compensation must be employed, some of which methods will be discussed hereinafter.

While the nature of speech is a main consideration, it is also desirable to keep in mind a few salient features of other sounds if intelligible speech is to be made from them. These other sounds, just like speech, may be periodic or random or mixed as regards frequency pattern. Similarly, they have certain spectra that characterize them. Thus, a note from the piano does not sound like the same note from a trombone, nor like that of the violin, etc. The notes, if sustained at constant pitch, still sound different because of different spectra, so that one can, if he desires, talk with musical instruments, using a different instrument for each of the forty or so phonetic sounds and a listener familiar with the code and the individual instruments could understand the musically spoken words. If speech or song is to be made from such instrumental music, the speech or song spectrum will largely determine the spectrum and the musical instrument the pitch. This, however, is not entirely so for, to a limited extent, the instrument spectrum can be shaped on top of the speech or song spectrum without completely removing the intelligibility from the speech or song. Also, music will go up and down in volume, which changes can be retained in large degree. If the music cadence is made the song cadence, the instrumental music feature can be retained in large degree. If the voice is to be made from a non-periodic sound, then the difficulty is greater, for it is only the spectrum that is available for giving the intelligibility of the speech and for giving the spectrum needed for that sound source. Nevertheless certain things can be done about it, as will appear hereinafter.

Figure 3:
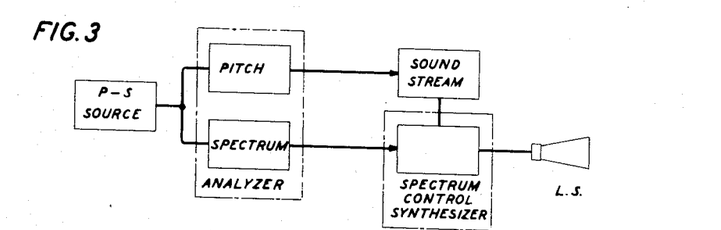
Figs. 3 to 6 show parts of this circuit in greatly simplified form.

While my invention resides in the circuits of Figs. 1 and 2, combined with additional structures which will be taken up later, a more ready understanding of some of the basic features of that circuit will be obtained by reference to the greatly simplified representation of Figs. 3, 4, 5 and 6. Thus, the basic circuit of the so-called "Vocoder" is shown in Fig. 3. In speech terms, it consists of a speech synthesizer controlled by a speech analyzer. In more general terms, it is a circuit for producing synthetic sounds with a spectrum determined by a sound source from a stream or streams of sound whose frequency pattern is controlled by the some original source. The name "Vocoder" brings out the method of operation in the case of speech, that is, by voice coding. It sets up voice in terms of a code from which a voice can be made. It specifies the voice in code and this specification, with or without modification, can be used to construct the voice from some suitable sound stream.

Figure 4:
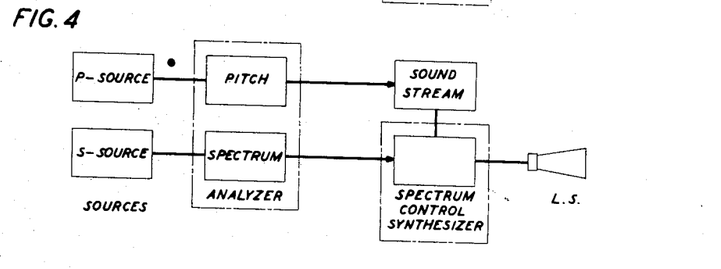
Figure 5:
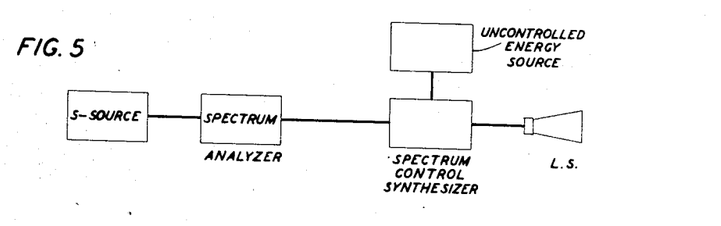

It is to be noted that in Fig. 3 all control of the reconstructed sound comes from the same original source of sound. This is not necessary. Fig. 4 is one way of operating the circuit of Fig. 1, which permits separate pitch and spectrum control, the $p$-source controlling the pitch and the $s$-source the spectrum. Fig. 5 shows still another way of operating the circuit of Fig. 1 in which no pitch analysis is employed but the frequency pattern of an uncontrolled energy source is used in the sound stream and subject to the spectrum control. It is obvious, however, that the spectrum analysis cannot similarly be done away with for the spectrum measures do not exist directly in speech and other sounds, but are obtained only by power-metering and then filtering out the actual signal components themselves while the pitch, if any, and the frequency pattern are directly in the original sound.

Figure 6:
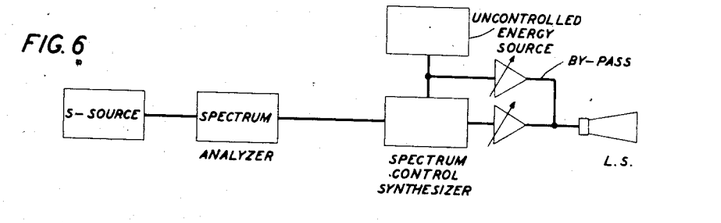
Figure 7:
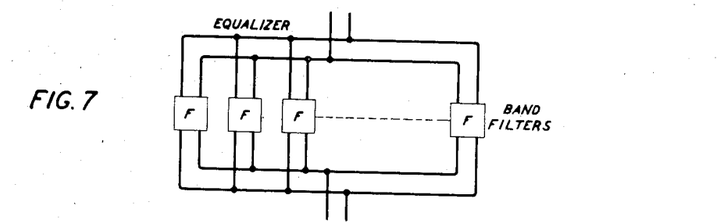
Figs. 7 to 13 show units of structure which may be interposed upon or inserted in the circuit of Figs. 1 and 2 in a manner which will be made clear in the later description.

While Figs. 3 to 5 show the chief control arrangements of interest, it is found that modifications of these circuits may usefully be made to enhance the effects. As an example, with the circuit of Fig. 5 if the sound of a train starting in motion is used as an uncontrolled energy source and the voice spectrum is applied to it there results a whispered voice of good intelligibility but so good a whispered voice as to sound very little like the starting train. In this case the effect of the "voice of the train" can be greatly enhanced artistically by passing some of the train sound directly to the loud-speaker, as shown in Fig. 6. In this simplified figure the connection is shown by means of variable gain amplifiers which serve the double purpose of buffer amplifiers, so that the output of one circuit does not react unfavorably on the other and also of a mixer control to give an adjustment to the amount of each sound for the optimum artistic effect.

The basic features of the circuit of Figs. 1 and 2 which are represented symbolically in Figs. 3 to 6 are essentially the disclosure of my Patent 2,243,089. Certain improvements, additions, and modifications to this circuit, however, have now been devised by which new and interesting effects are obtained. Some of these will now be explained in seriatim as follows:

(1) *Circuit for retaining of the energy source spectrum*

One method for accomplishing the above result has been shown in connection with Fig. 6. Another method is by the introduction of suitably modifying circuits 20 and 21 which are shown as equalizers in Fig. 2. At this point as well as elsewhere throughout this specification the term "equalizer" is to be understood as covering any network which will modify the distribution of energy as a function of frequency in a desired manner. Such an equalizer, for example, may be designed to give a loss throughout the frequency spectrum following one plan or another. Also, it may be designed to pass bands of frequencies and suppress others. Thus, in Fig. 7 the equalizer may take on the form of a number of parallel band-pass filters. For the purpose of retaining some of the energy source spectrum, I find it advantageous at times to have the equalizer 20 of Fig. 2 of a form passing certain frequency bands, whereas certain other frequency bands are passed through the equalizer 21. As an example, alternate 300-cycle bands may be passed by the circuit containing 20 and the intervening 300-cycle bands by that containing 21. The missing bands will affect the understanding of the speech very little, nor will they appreciably affect the recognition of the sound source. Obviously, all sorts of band selections including the overlapping of bands can be used, as may be determined to be most effective in a particular instance.

(2) *Correcting the level of the energy source*

Good results to this end are obtained in giving voice to various sounds by the circuits of Figs. 1 and 2 with a voice from an $s$-source such as B and a sound lacking in voice (say from the H source) when the sound at H is of a fairly steady level and has a fair sprinkling of frequency components of reasonably uniform strength in the audible frequency range. These conditions can be departed from in considerable degree without too much damage to the desired result. When the deviations become too serious, however, correction along one or both lines becomes necessary. Thus, at 24 and 25 there is shown a volume control circuit. The volume control may be of any of the well-known types developed for telephone use which adjusts the level out of the energy source to a reasonable consistency so that the modulators $SN_1$, etc., in the synthesizer $C_2$ will handle it well. Specifically, this volume control comprises a compressor 24 which may be of any suitable form, such for example, as that shown in the patent to Norman 2,063,334, December 8, 1936. Subsequent to the modulator, there is inserted a restoring corrector 25 so that there is no over-all effect except that of improvement in the impressing of speech intelligibility on the sound stream. Such a corrector may be of the form of expander also shown in the patent to Norman. A switch 26 may be inserted, if desired, in the connecting link from the compressor to the expander circuit, by which the latter may be rendered ineffective. Also, a switch 27 makes it possible to include the compressor 24 in the circuit or not, as desired.

Another helpful circuit is obtained by the use of a weak parallel energy source shown at J, in that it maintains a minimum level. By means of this when very low levels are reached, the speech can be formed of this emergency sound stream. This is particularly helpful when the sound is by nature intermittent or of such short duration as not to give time for shaping the sound stream. The crowing of roosters and the barking of dogs are examples where it may be useful in applying speech thereon. The energy source can be chosen to simulate the type desired fairly well. An equalizer 29 may be used to obtain a spectrum reasonably like that of the sound stream for which it is substituted at low levels. The sources J or H may be connected in circuit by operation of relay 18 through switch 19, either for a long period by a battery or intermittently from the pitch control circuit.

(3) Correcting the spectrum of the energy source

When the distribution of power with frequency is poor, it may be desirable to throw in an equalizer of a different nature from that described specifically above, as the equalizer 20 taken in combination with the complementary restoring equalizer 22. If the power variation over the useful frequency range is too great, then it may be desirable to use only partial correction in the restoring equalizer, thus retaining both good intelligibility in the impressed speech and good recognition of the original sound to which the voice is to be given. A multiplicity of such correcting circuits may be used with an operator choosing the proper one at the moment in case of sound material fluctuating widely in its spectrum relations. As shown in the circuit, the equalizers 20 and 22 as well as the equalizer 21 may be introduced into the circuit or not as desired by means of the switches 33, 24 and 35.

From the speech standpoint considerable difficulty occurs when the source is a reasonably pure single tone, as in the case of a whistle. In this event a non-linear circuit 31 of one of various sorts should be provided to generate upper harmonics. These can then be equalized, modulated and afterwards corrected to the desired extent by the equalizer 20. Leaving the newly created harmonics at a sufficiently low level will not detract from the whistle-like characteristic but will greatly aid in permitting intelligible speech to be formed thereon.

(4) Adding pitch to unvoiced sounds

One scarcely realizes how many sounds are of a random nature until he starts to give voice to them. In many cases the resulting whispered speech does not have the desired effect psychologically. As an example, if the roar of Niagara Falls is used, the resultant whisper is unsatisfactory. We think of the powerful orator as a man who uses his vocal cords vociferously and does not merely whisper. Again, the beating of the surf may sound much more effective if given a woman's voice to simulate a mermaid. Another objection to the whisper is the lack of life and expression and feeling in the whisper as compared to well-inflected speech. Because of this, it may be desirable to add voicing to the energy source and in some other cases to convert voice sound to a whisper. A simple way of accomplishing the former is by the tone-operated relay 40 of Fig. 2 shown as controlled by a tone generator 41 when the switch 42 is in the appropriate position. This gives a monotone and is a mixed energy source that is in part periodic and in part non-periodic. However, by using the pitch control circuit on the relay 40, operating up through Lo of Fig. 1 and through the switch 42 set to a corresponding position, inflection can be obtained from the talker. The pitch frequency may be used directly without passing through the frequency measuring circuit F, as in the general case of pitch analysis. It will be understood that relay 40 vibrates its armatures in unison with the applied tone or voice fundamental.

Figure 8:
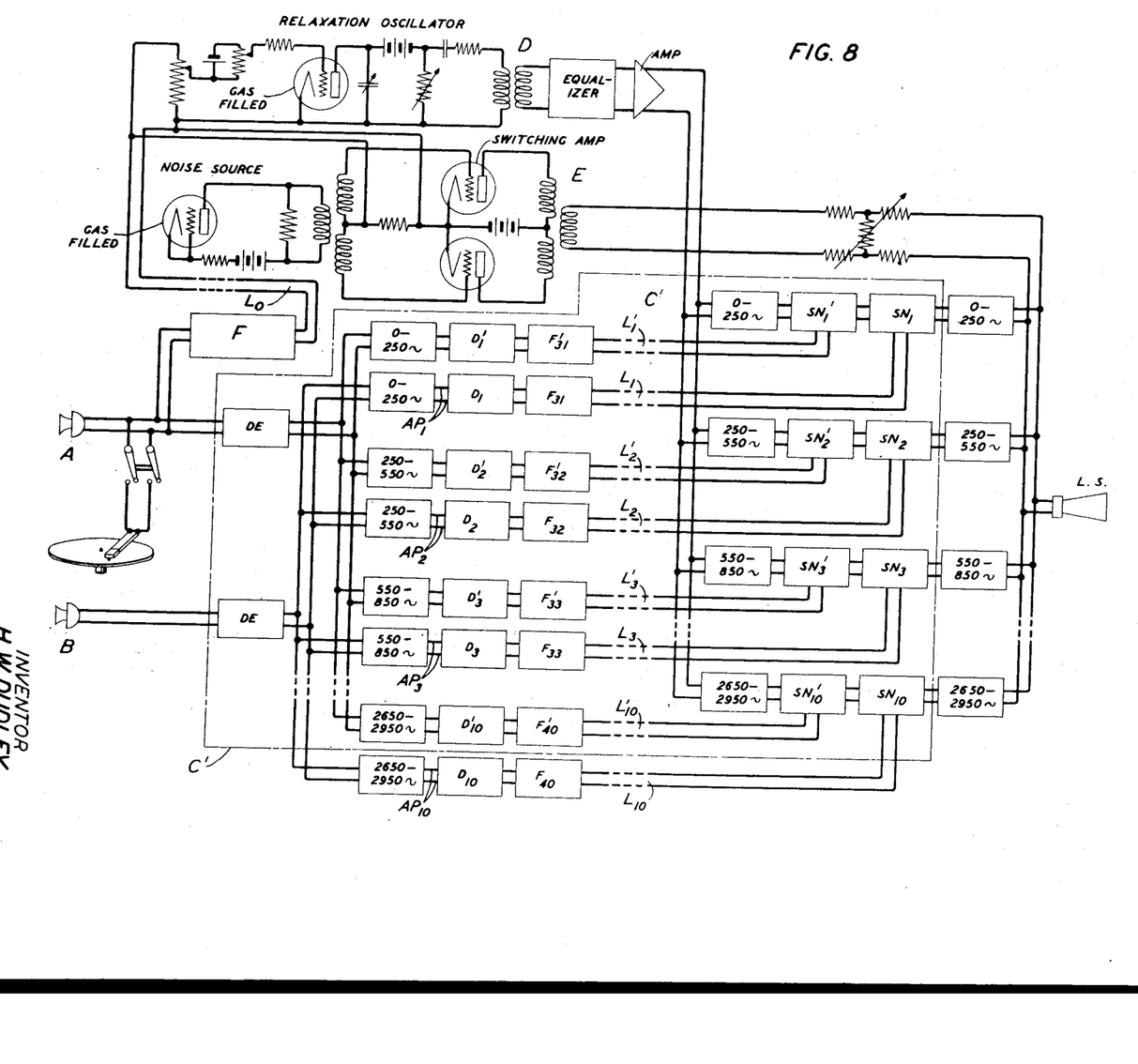

Another circuit by which pitch may be added to unvoiced sounds is shown in Fig. 8 which comprises a circuit that converts the random sound to a periodic sound of the same spectrum and uses this for the forming of speech from the given sound source. In this circuit the unit represented by C' of Fig. 8 takes the place of the unit $C_1C_2$ of Figs. 1 and 2. The pitch control may be that of a voice whose spectrum is to be used. Thus a source such as that corresponding to B of Fig. 1 is passed through an analyzing circuit of the form shown in C'. In addition a second source, such as that shown at A, supplies a voiced wave which is applied to a similar analyzer shown in juxtaposition to the first analyzer in Fig. 8. The buzz and hiss energy from D and E, under control of the frequency pattern from A in the same manner as for Fig. 1, is supplied to the synthesizer portion of C'. This latter synthesizer differs from that of $C_2$ in that it is subject to independent control of the spectrum both from A and from B. This latter is accomplished specifically in Fig. 8 by two tandem modulator structures SN and SN' connected in series. Obviously any other source may be used instead of that from A. Ordinarily this unit of Fig. 8 would be a part of the total unit and its insertion would be accomplished by switching mechanism of any suitable type. In order, however, to avoid confusion this unit of Fig. 8 has not been shown as a part of Figs. 1 and 2.

(5) Discrete pitch steps

An interesting voice effect is obtained by using discrete pitch steps, thus avoiding the normal glides from lower pitch to higher and vice versa. The manner of going from one pitch level to another has a decided effect on the expression obtained. Thus, if a person lets his voice run slowly up and down in pitch it tends to make a sing-song pitch. In the case of musical instruments, such as a piano or stop-type horn, pitch levels are maintained quite accurately. In other instruments, such as the violin and a sliding-type horn, gliding pitch is obtainable. If simple glides are used with the horn, it has an odd effect that is not too pleasing but sounds rather as though the instrument were not under complete control of the operator. In some instances a vibrato effect is obtained by varying the pitch up and down slightly about the average point. This is done on a violin by varying the physical pressure and is carried out on pipe organs by special devices used for this purpose. In these cases the musician may deviate more from the average pitch than would be permissible with a strictly fixed pitch used for the note.

When discrete pitch steps are applied to the voice, it is found that the speech or sound produced sounds like those from an instrument. Thus, a circuit may be used giving seven pitch levels obtained sequentially by turning a dial. When the song is made from a relaxation oscillator of the type shown at D of Fig. 1 which follows such pitch levels, it sounds much like a saxophone producing the song.

Figure 9:
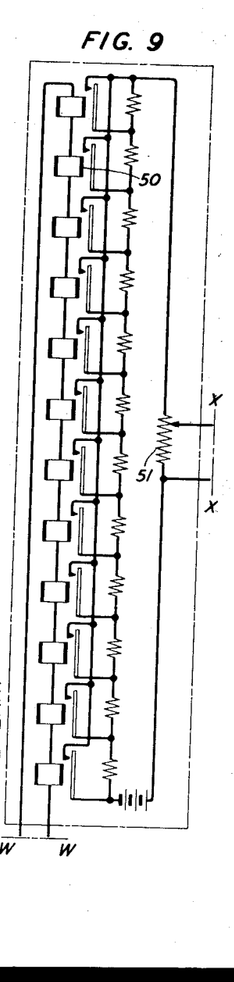

Discrete pitch selection for the purposes indicated above can be obtained by operating on the input of the relaxation oscillator D. Fig. 9 shows one means for accomplishing this, there being a series of differential relays 50 changing the magnitude of the current flowing through the resistor 51. This unit of Fig. 9 would be substituted in place of the resistor 51 of Fig. 1 by making the corresponding connections at W and X. Ordinarily, this unit of Fig. 9 would also be a part of the total unit and its insertion would be accomplished by switching mechanism of any suitable type. In order, however, to avoid confusion this unit of Fig. 9 has not been shown as a part of Fig. 1.

It is evident that by the use of these differential relays according to which ones have operated at the moment, different pitch levels are obtained. Twelve relays are shown but obviously any number can be used. One case of interest would be to use a sufficient number so that the relays covered an octave or two octaves of pitch and to have the resistances so arranged as to produce the various steps of the musical scale. Then as a person sings, the pitch analysis will give current levels which can be made to operate these relays so as to produce the pitch of the note he was singing or the pitch of the note multiplied by some constant factor. The results, I find, sound like a saxophone or other instrument singing instead of the person. The current for controlling the relays can be obtained from other sources than pitch analysis. As an example, a current representing a measure of the audible energy of the voice may be used, or a measure of the energy of the voice in a particular frequency band or a phonograph record, or any other sound source independent of the spectrum control at the moment.

It is also apparent that these pitch steps can be arranged in any desired fashion, the size of the steps to be varied and the order of their appearance with increase in current being arranged as desired. As an example, a talker with a low pitch could operate relays so as to throw out high pitch levels, whereas a talker with high pitch levels could throw out low pitch levels.

Figure 10:
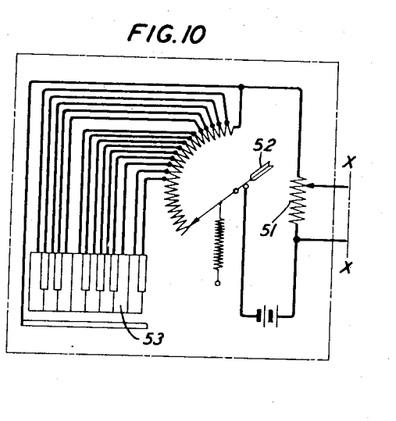

Another means for obtaining a discrete pitch step with an arrangement for manual control is shown in Fig. 10, this to be inserted in place of the resistor 51 of Fig. 1 by a suitable switching means. The variation in pitch in this case may be obtained by manual operation of the member 52 and may either be continuous or may be in discrete steps by using taps on the resistance in the potentiometer. To go from a low pitch to a high pitch by means of the member 52 it is necessary to go through intervening pitches. However, as shown in Fig. 10 a keyboard arrangement 53 may also be used by which discrete pitch steps may be employed without the use of intervening pitch steps, in a manner similar to the pitch control on a piano or an organ.

(6) *Spectrum shifts and control*

Figure 11:
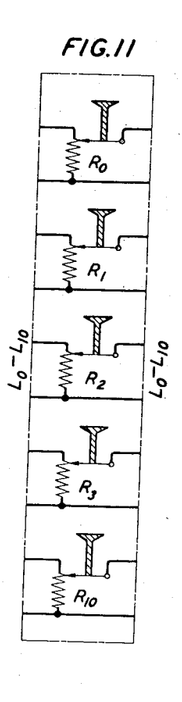

All of my work in this field has indicated that the spectrum fixes the intelligibility. Accordingly, control or shifts of the spectrum tend to alter the intelligibility. However, I find that various substantial shifts of spectrum can be made with only minor losses of intelligibility. Obviously, almost countless combinations of changes would be possible, some automatic and some by manual control. Only a relatively few of these would be of interest, especially if applied to the buzzer and hiss energy sources of Fig. 1. If, however, instead of the usual buzz and hiss source we substitute a voice, certain interesting effects can be obtained by controlling the spectrum of this voice manually. Thus, Fig. 11 shows a manual control device to be inserted directly in the lines $L_0$ to $L_{10}$ between the synthesizer $C_2$ and the analyzer $C_1$, of Fig. 1, this being accomplished by suitable switching mechanism. As the finger controls for the spectrum channels are pushed, varying amounts of current are transmitted. In this way there is obtained a spectrum circuit control of far greater flexibility than is obtained from the original voice, this being obtained by increasing or decreasing the loss by means of the variable resistors of Fig. 11.

Figure 12:
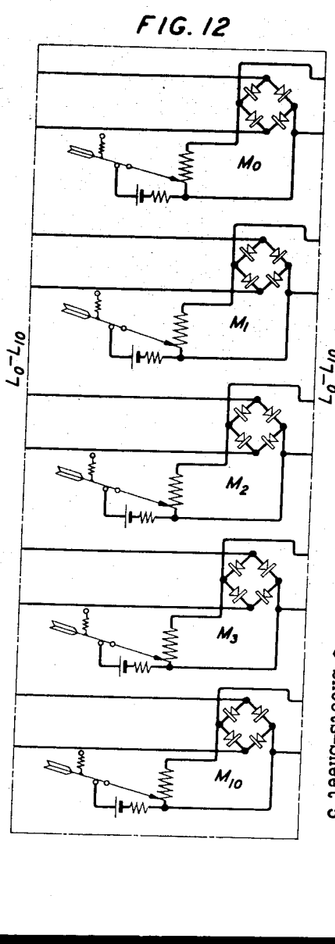
Figure 13:
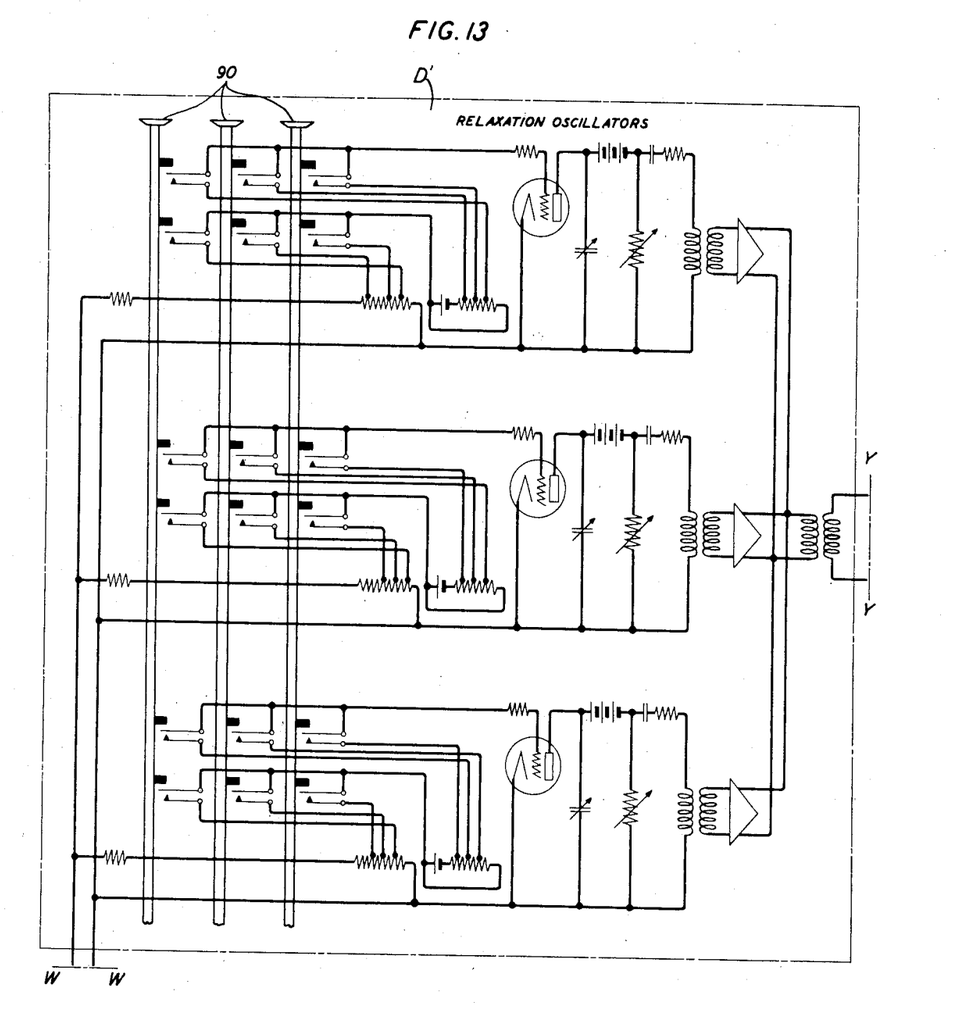

As a modification of this, reference may be made to Fig. 12, which shows a structure for insertion in place of the structure of Fig. 11. In this structure the manual control is obtained by changing the bias on the modulators $M_0$ to $M_{10}$ of the synthesizer. By means of such manual controls applied in the various spectrum channels, I find that one can adjust his voice with a flexibility that the human vocal system itself does not permit and with a combination of such control on sources D and E makes it possible for one to say one sound and convert it into another sound; or a separate person operating the vocal controls can modify the speech of the talker even to the extent that such an uttered word as "yes" comes out as "no."

In a further modification along this line it is evident that one may have a normal voice or other sound such as from the source H of Fig. 2 coming directly to the synthesizer $C_2$, which synthesizer is preceded by the arrangement of Fig. 12 and the analyzer $C_1$ is rendered ineffective.

(7) *Inflection adjustment*

The circuit of Fig. 1 also permits an instantaneous control of the inflection range. In this two features are involved. In the first place, there is a setting to obtain the proper average pitch, this coming about either through batteries 60 or 61. In the next place, there is a control arrangement to adjust the variation of pitch as the current comes down the line from the pitch analyzer or any other source, this variation being obtained through the potentiometer 51. The adjustment of this potentiometer may be obtained in any manner desired, such as finger controls.

Demonstrations on changing the pitch range show that when a person talks with expression he automatically gets a fairly wide pitch range. Accordingly, if we take a normal pitch range and use the circuit as just described to increase it, it is found that the voice gets much more life and expression, sounding far better. If, however, this increase of pitch range is carried too far, then a sing-song unreal effect is produced and gives a decidedly affected voice. If the pitch range is decreased, then the emotional quality that enters seem that of insincerity. The talker does not appear to exert enough effort to show his interest feeling in his subject.

(8) *Pitch swings*

The effect of varying the pitch about an average value is also of interest. I find in the case of a song that if the pitch is automatically varied three times a second, it sounds like a labored change of the tone of the voice. If next the pitch is swung up and down six times a second, a good vibrato is produced with this voice. If, then, the variation of pitch is made ten times a second, I find that the voice becomes tremulous and so less pleasing. Accordingly, a definite value of pitch is indicated as the optimum for the vibrato of song. It appears that a higher pitch should have a higher variation of pitch. Thus, with a very low bass voice the three up and down variations of pitch per second are good. Again, with a high soprano voice a fairly good coloratura effect is obtained with an up-and-down swing of ten times per second. One means for obtaining the vibrato control of pitch is shown by the generator at 65, which may be introduced into the circuit or not, as desired, by the switch 66. On changing the amplitude of the voltage generator by the loss device 67 the amount of swing up and down is controlled. From this circuit there is found a definite indication of an optimum value of this swing. If it is made less than this, the vibrato effect is not observed. When it is made greater than this, the vibrato effect becomes unpleasing again. In connection with the generator 66, it is obvious that the swing voltage can be made of various forms other than purely sinusoidal.

(9) *Slow swings of intensity*

Just as the pitch can be controlled so that it swings up and down at slow rates, so also the intensity can be controlled to swing up and down at the same or at a different rate. This can be obtained by the loss device 70 of Fig. 1 in which the extent of the loss is varied at a low frequency by the oscillator 71 and resistor 72 to produce the desired variation of amplitude. Various effects can be obtained by swinging the intensity various amounts and at various rates, as is readily apparent from the circuit.

In addition to the amplitude control and the pitch control taken separately, these two can be used simultaneously. Either separate voltages may be used for controlling the pitch swings and the intensity swings, or the same voltages with a different or the same amplitude and phased in any desired fashion.

(10) *Automatic pitch changes*

It appears that almost any change of pitch produces a definite voice effect corresponding to something that is found in the human voice. The degree of the effect, however, may be much greater or much less and is under control of the circuit. One example of this is that a low initial plate voltage applied to the relaxation oscillator makes a decided voice characteristic. Thus, starting the pitch each time about 40 per cent high gives the voice the effect that I have labeled a "tearful voice" because it is somewhat whining. Similarly, the opposite effect of starting the voice pitch too low each time gives the effect of jolly robustness to the voice. These effects may be obtained by changing the character of the plate circuit supply of the relaxation oscillator. If, for example, the rectifier circuit of D is connected as shown, the presence of the condenser 76 gives the tearful voice effect, whereas if the circuit is altered to include the inductance 77 then the jolly voice effect is produced. This arises because by the use of a condenser or an inductance the initial surge of current is somewhat different from the later average voltage. It is obvious that many different networks could be thrown in by relays or otherwise to produce various automatic changes of pitch to simulate various odd voice effects of the kind that are found in human nature or to simulate animal or other sound-making voices.

(11) *Substitution of irrelevant sounds*

In the upper right-hand portion of Fig. 2 there is shown a circuit for substituting an irrelevant sound from a source 80 for each unvoiced sound. This irrelevant sound may be an unvoiced sound, such as "s" or "sh," or it may be a voiced sound or a non-human sound. This irrelevant energy source may be made effective through the switch 81 controlling the relay 82, the operating impulses for the relay 82 being shown as derived from the pitch control circuit $L_0$. Also, by means of the switch 84, the substitution of the irrelevant sound for each voiced sound is provided for. One development of this circuit would be to arrange the switching device so that it operates only on true vowel sounds and in such case substitutes a single vowel sound regardless of what vowel sound is used for control. The substituted arrangement may be adjusted so that it is carried out only by operating on a strongly indicated fundamental sound. In the consonant sound there is, in general, a less strong fundamental sound. These consonant sounds could all be made out of the hiss source at D or out of any other energy source it is desired to substitute.

(12) *Harmony combinations*

By using a plurality of relaxation oscillators in place of the single ones shown at D of Fig. 1, it is possible to obtain various harmony effects. As an illustration of this, reference may be made to Fig. 13 which shows a keyboard arrangement for obtaining a quartet of voices where the voices do not go up and down together in unison, but rather swing in harmony parts according to a cord determined by the particular combination of the keys 90 which may be depressed at the moment. In the total circuit the structure of D' would in general take the place of the structure of D. All except one of the three relaxation oscillators of Fig. 13 could be rendered ineffective and the remaining one would operate in accordance with the description of the structure of D already given. On the other hand, if harmony effects are desired, then these three or more independent relaxation oscillators would all be rendered effective and subject to the keyboard arrangement. In the event of the replacement of D by D', it is apparent that the connections would be made at the points of W and Y of Fig. 1.

From the description thus far given of my invention it is apparent that many different kinds of effects may be produced by using one or another or various combinations of the structures described. Some of these effects have already been pointed out, but certain others may be mentioned as follows:

Special music forming

Here the energy source used may be one musical instrument, such as a pipe organ coming from the source H, while the spectrum control apparatus might be from another, such as B, using for example a drum. This results in a drum beat of unusual musical character. The voice, for example, might be used as the energy source at H with a sustained sound, such as "Oh" and the drum beats would then sound like a repeating "Oh," "Oh," "Oh" or a series of words may be spoken and the drum beaten in time with it.

Jew's-harp

If the relaxation oscillator is set for a monotone such as 125 cycles and a whistle is introduced at the source B, then a jew's-harp effect is obtained. The important point here is that a jew's-harp has a fixed pitch and the relaxation oscillator is set for a fixed pitch. When this is done the effect of whistling with its regular sharp signal frequency characteristic is to move the selected spectrum up and down from one filter to another in the analyzer $C_1$. This is similar to what happens when mouth positions are changed as a jew's-harp is thrummed. It is obvious that by choosing the filter bands of proper width on the analyzer and widening them or decreasing the frequency band width in the synthesizer one can get the jew's-harp effect over a wide range of tuning, such as is not possible with any actual jew's-harp. In other words, in this way the jew's-harp can be extended to as low and to as high frequencies as deired. Similarly, an airplane roar can be simulated.

Fog Horn

The human voice cannot copy a fog horn very well because of the low fundamentals below 25 cycles per second. However, by setting the relaxation oscillator at a low pitch (say, about 20 cycles) a fog-horn effect can be produced using a low fundamental from the buzzer source and going through the motions of the human speech parts as though making a fog horn sound. Actually the pitch of the sound source at B is too high, whereas the remade sound has the right pitch. Similar effects may be obtained with steamboat whistles, tugboat whistles, etc.

Language change

As an illustration of what may be obtained in this direction, one may use a Spanish talking film as the source of energy at H. This is passed through amplifier 85, which may then be set to an overload condition, thereby serving both to distort the spectrum so that the Spanish sounds are less clearly understood and also to set up frequencies over the voice range thus permitting new sound spectra to be formed thereon. Suitable equalizers such as 20 may also be used in the circuit. Then by the use of the spectrum control from the source B with the voice toned for English words corresponding in length and spacing to the Spanish words, an English interpretation of the Spanish material is given.

Another illustration is that of using an energy source sound track having, for example, the words "The cat chased the dog." This is readily changed into "The dog chased the cat," or other combinations of words, so long as these words are of about the same length and spacing as the original source. One application of the above expedient is to obtain an effect much desired in the motion picture art where it is wished to make copies in various foreign languages by using the present talking track so far as possible to avoid the costly process of assembling a new sound track for that language.

It is to be emphasized that in the description of my invention only a few of the various combinations which can be created have been given. It is also evident that many variations in the circuit arrangements are possible, these being omitted for the sake of simplicity in the disclosure. Thus, while the various circuit changes have, in general, been shown as obtainable by simple switches, any or all of these could be operated by relays singly or in various combinations.

What is claimed is:

1. A combination for producing a novel sound effect comprising a source of sound waves, means for translating the sound waves from said source into electric currents and for making a frequency spectrum analysis thereof, a second source of sound waves, means for translating the sound waves from said second source into electric currents, means for synthesizing the electric currents corresponding to the sound waves from said two sources, means for translating the synthesized currents into sound waves, and means between each of the first two mentioned means and the synthesizing means to control the output from the synthesizing means separately in accordance with selected characteristics of each of the two sources of sound waves.

2. A combination for producing a novel sound effect comprising a source of sound waves, means for translating the sound waves from said source into electric currents and for making a frequency spectrum analysis thereof, a second source of sound waves, means for translating the sound waves from said second source into electric currents, means for synthesizing the electric currents corresponding to the sound waves from said two sources, means for translating the synthesized currents into sound waves, and networks between each of the first two mentioned means and the synthesizing means to control the output from the synthesizing means separately in accordance with selected characteristics of each of the two sources of sound waves.

3. A combination for producing a novel sound effect comprising a source of sound waves, means for translating the sound waves from said source into electric currents and for making a frequency spectrum analysis thereof, a second source of sound waves, means for translating the sound waves from said second source into electric currents, means for synthesizing the electric currents corresponding to the sound waves from said two sources, means for translating the synthesized currents into sound waves, a network between said second-mentioned means and said synthesizing means for passing certain frequencies only and a second network between said second-mentioned means and said fourth-mentioned means for passing certain frequencies only.

4. The combination of claim 3 in which the second network is complementary to the first network passing those frequencies which are not passed by the first network.

5. A combination for producing a novel sound effect comprising a source of sound waves, means for translating the sound waves from said source into electric currents and for making a frequency spectrum analysis thereof, a second source of sound waves, means for translating the sound waves from said second source into electric currents, means for synthesizing the electric currents corresponding to the sound waves from said two sources, means for translating the synthesized currents into sound waves, a plurality of band-pass filters between said second-mentioned means and said synthesizing means, and a plurality of band-pass filters between said second-mentioned means and said fourth-mentioned means.

6. The combination of claim 5 in which said first plurality of filters are individually selective to different frequency ranges from those to which said second plurality of filters are selective.

7. The combination of claim 5 in which said first plurality of filters transmit different spaced frequency bands and said second plurality of filters transmit the frequency bands intermediate said spaced frequency bands.

8. The combination of a sound wave source, means for translating said sound wave into corresponding electric currents and for analyzing the frequency spectrum of said currents, a source of sound waves to be modified by the sound waves from said first source, means for translating the sound waves from said second source into electric currents, means for synthesizing the electric currents from said two means, automatic volume control means in the path between said second and said third means, and means for translating the synthesized electric currents into sound waves.

9. The combination of claim 8 but with a restoring compensator between said third and said fifth-mentioned means.

10. The combination of a source of sound waves, a second source of sound waves, means for modifying sound waves from said second source in accordance with a characteristic of the sound waves from the first source, the sound waves from said second source experiencing very low levels, and an additional source of sound waves for supplementing the sound waves from said second source during such period of low level, whereby sound waves of the character of those derived from said second sound source are continuously available for modification in accordance with a characteristic of the sound waves from said first source.

11. The combination of claim 10 characterized by the fact that there is an equalizer between said additional source and said modifying means.

12. In a combination comprising a source of sound waves, a second source of sound waves, means for translating sound waves from each source into corresponding electric currents, means for modifying the currents from said second source in accordance with a characteristic of the sound waves from said first source, and means for translating the modified or synthesized currents into sound waves and in which the distribution of power with frequency in the case of the sound waves from said second source differs from that desired, means between the second sound source and the modifying means to compensate for said maldistribution, and complementary restoring means between said modifying means and said third-mentioned means.

13. In a combination comprising a source of sound waves, a second source of sound waves, means for translating sound waves from each source into corresponding electric currents, means for modifying the currents from said second source in accordance with a characteristic of the sound waves from said first source, and means for translating the modified or synthesized currents into sound waves and in which the sound waves of said second source represent a substantially pure, single tone, means intermediate the second source and the modifying means to add harmonics of said tone to the sound waves to be modified in accordance with a characteristic of the sound waves from the first source.

14. The combination of claim 13 in which the said means to add harmonics comprises a non-linear circuit.

15. The combination of claim 13 in which additional means is included between the modifying means and the third-mentioned means to compensate for said added harmonics.

16. The combination of claim 13 in which additional means is included between the modifying means and the third-mentioned means to compensate in part for said added harmonics.

17. In a combination comprising a source of sound waves, a second source of sound waves, means for translating sound waves from each source into corresponding electric currents, means for modifying the currents from said second source in accordance with a characteristic of the sound waves from said first source, and means for translating the modified or synthesized currents into sound waves, the sound waves from said second source being of a random nature, and means to add voicing to said sound waves intermediate said second source and said modifying means.

18. The combination of claim 17 in which said voicing means comprises a tone-operated relay.

19. The combination of claim 17 characterized by the fact that the voicing means comprises a relay operated by means responsive to the pitch of the sound waves from said first source.

20. The combination of a source of sound waves requiring voicing, a second source of sound waves in accordance with a characteristic of which said first sound waves are to be modified, means for synthesizing a particular characteristic of each of said sound waves, means for modifying said synthesized characteristics in accordance with the pitch characteristic of the sound waves of said second source, and means for generating sound waves having said modified characteristics.

21. The combination of a source of sound waves requiring voicing, a second source of sound waves in accordance with a characteristic of which said first sound waves are to be modified, means for translating the sound waves from each source into corresponding electric currents, means in the path of each of the said electric currents for analyzing the frequency spectrum of said currents, means for synthesizing a particular characteristic of each of said sound waves, the said means being subject independently to the output of the means for analyzing the frequency spectra and additional means for modifying the said synthesized characteristics in accordance with a fixed characteristic of the sound waves of said second source, and means for generating sound waves having said modified characteristics.

22. In combination, a relaxation oscillator and means for varying the pitch of the output wave thereof in discrete steps comprising a plurality of relays responsive one at time to different strengths of a control current characteristic of the pitch of a sound wave.

23. In combination, a source of sound waves, means for translating said waves into corresponding electric currents, means for subdividing said currents into a plurality of frequency bands, a plurality of modulators, one for each of said frequency bands, means for supplying a direct current to each modulator and for varying the current to each independently of the others, and means for synthesizing the outputs of said modulators and for translating the synthesized outputs into sound waves.

24. In combination, a source of sound waves, means for translating said waves into corresponding electric currents, means for subdividing said currents into a plurality of frequency bands, means for deriving a current characteristic of each of said frequency bands, manually operable means for independently varying each of said currents, means for deriving a current characteristic of the pitch of said sound waves, manually operable means for varying said pitch characteristic current, a source of electric waves, means in which electric waves from said electric wave source are modified in accordance with said frequency band characteristic currents, the frequency spectrum of the waves from said electric wave source being in accordance with the pitch characteristic current, and means for translating the modified currents into sound waves.

25. In combination, a relaxation oscillator comprising a gas-filled tube with cathode, anode and input grid, means connected to said cathode and grid whereby the currents generated by said tube are of preassigned pitch, means to apply a pitch-controlling current to said grid and cathode to change the initial pitch, and means to vary the initial pitch as such pitch-controlling current is incoming to said oscillator.

26. In combination, a relaxation oscillator for generating currents of pitch in the voice frequency range, said oscillator comprising a gas-filled tube including a cathode, grid and anode, and means connected to said cathode and anode to supply said anode with energizing potential and including a network whereby the initial pitch of potential to said cathode-anode circuit is of different order than the subsequent average potential.

27. The combination of claim 26 in which the network comprises a resistance and a condenser.

28. The combination of claim 26 in which the network comprises a resistance and an inductance.

29. The method of changing one word into another word of about the same length that comprises amplifying and distorting electric currents corresponding to the one word whereby a new frequency spectrum for said currents is established, and separately modifying different frequency regions of the amplified electric currents in accordance with an individual characteristic of the sound waves corresponding to said other word, whereby if said modified electric waves are translated into sound waves the latter will be heard as said other word.

30. The method of changing a succession of words having one significance into a succession of words having a different significance that comprises amplifying and distorting electric currents corresponding to said one succession of words, whereby a new frequency spectrum for said currents is established, and separately modifying different frequency regions of said amplified currents in accordance with an individual characteristic of said other succession of words, the latter succession of words corresponding in length and spacing to the said one succession of words, whereby if said modified electric currents are translated into sound waves the latter will be heard as said other succession of words.

31. An arrangement to enable one singing voice to accomplish the effect of a quartet with part harmony comprising means for translating the vocal rendition into electric waves, means for deriving a single control current characteristic of the pitch of said vocal rendition, a plurality of oscillators responsive to said single control current, means individual to the input circuit of each oscillator for varying the effect of said current on the frequency output of each oscillator, means for deriving currents characteristic of the frequency spectrum of said vocal rendition, means for modifying the output currents of each of said oscillators in accordance with the frequency spectrum characteristic currents, and means for translating said modified currents into sound waves.

HOMER W. DUDLEY.